United States Patent
Johnsen et al.

(10) Patent No.: US 7,919,926 B2
(45) Date of Patent: *Apr. 5, 2011

(54) AGGREGATE IGNITION METHOD IN HIGH FREQUENCY METAL HALIDE LAMPS

(75) Inventors: Andrew Johnsen, Danvers, MA (US); Phillip Whitt, Salem, MA (US); Harold Rothwell, Hopkinton, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 363 days.

This patent is subject to a terminal disclaimer.

(21) Appl. No.: 12/167,024

(22) Filed: Jul. 2, 2008

(65) Prior Publication Data

US 2009/0289565 A1    Nov. 26, 2009

Related U.S. Application Data

(60) Provisional application No. 61/055,867, filed on May 23, 2008.

(51) Int. Cl.
*H05B 41/00* (2006.01)

(52) U.S. Cl. .................... 315/209 T; 315/246; 315/283; 315/299; 315/307; 315/360

(58) Field of Classification Search ............. 315/209 R, 315/224–226, 209 T, 246, 283, 287, 291, 315/299, 307–309, 360
See application file for complete search history.

(56) References Cited

U.S. PATENT DOCUMENTS

| | | | |
|---|---|---|---|
| 5,463,287 A * | 10/1995 | Kurihara et al. | 315/307 |
| 6,392,365 B1 * | 5/2002 | Zhou et al. | 315/291 |
| 6,404,140 B1 | 6/2002 | Nerone | |
| 6,407,514 B1 | 6/2002 | Glaser et al. | |
| 6,479,949 B1 | 11/2002 | Nerone et al. | |
| 6,819,057 B2 | 11/2004 | Alexandrov | |

OTHER PUBLICATIONS

Lin et al., "2.65 MHz Self-oscillating Electronic Ballast with Constant Lamp-Current Control for Metal Halide Lamp", 37th IEEE Power Electronics Specialists Conference, Jun. 18, 2006, 6 pgs.

* cited by examiner

*Primary Examiner* — Thuy Vinh Tran
(74) *Attorney, Agent, or Firm* — Shaun P. Montana

(57) ABSTRACT

A high frequency ballast for a metal halide lamp comprises a controller, a switch, and an oscillator. The controller selectively enables and disables the oscillator via the switch to ignite the lamp. The ignition method includes enabling the oscillator such that the oscillator provides the lamp with a pulse train comprising a rapid series of short ignition pulses, cools for a period of time, and provides an addition pulse train to the lamp if necessary to ignite the lamp. When the lamp ignites, the ballast maintains enablement of the oscillator.

20 Claims, 11 Drawing Sheets

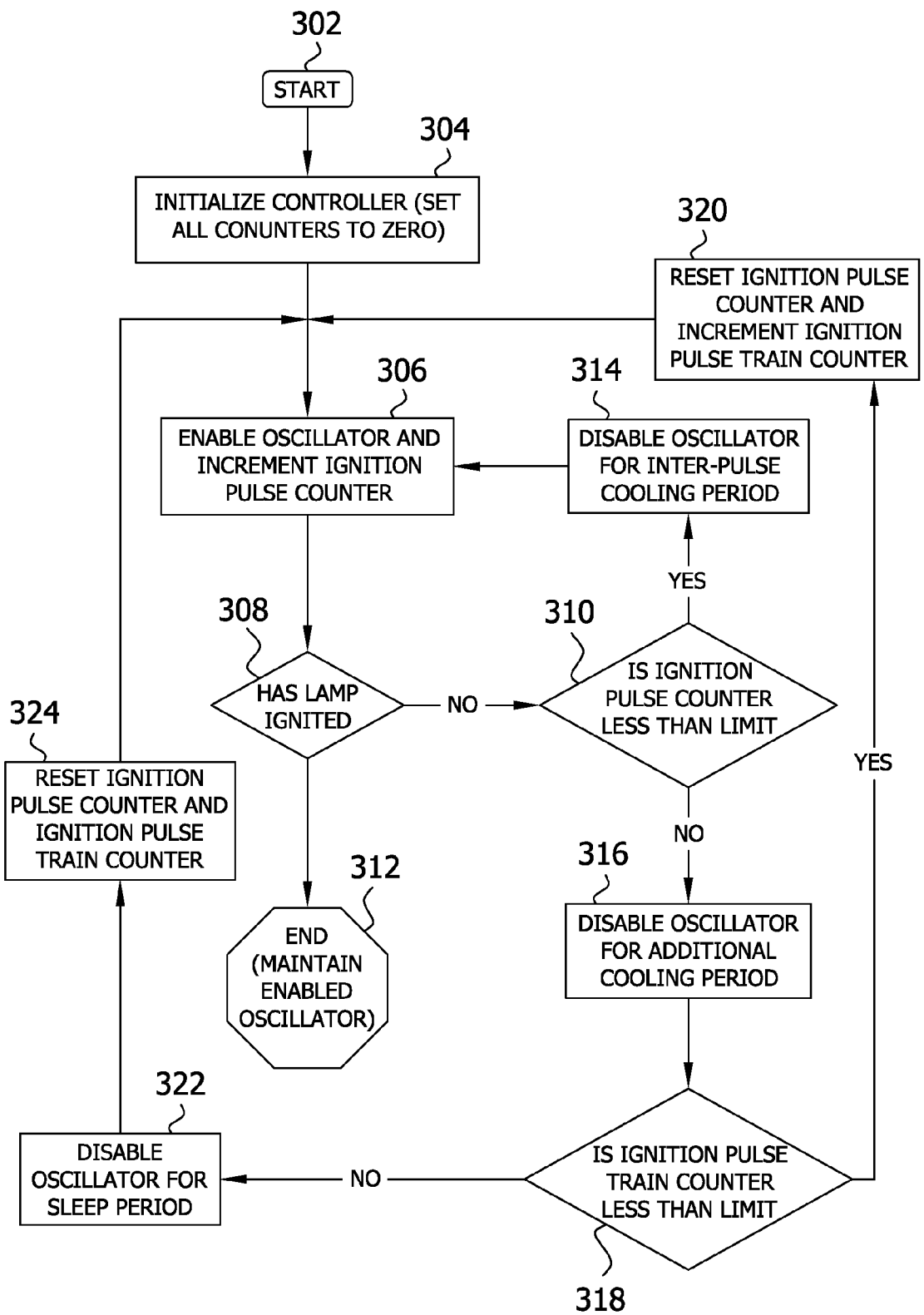

FROM

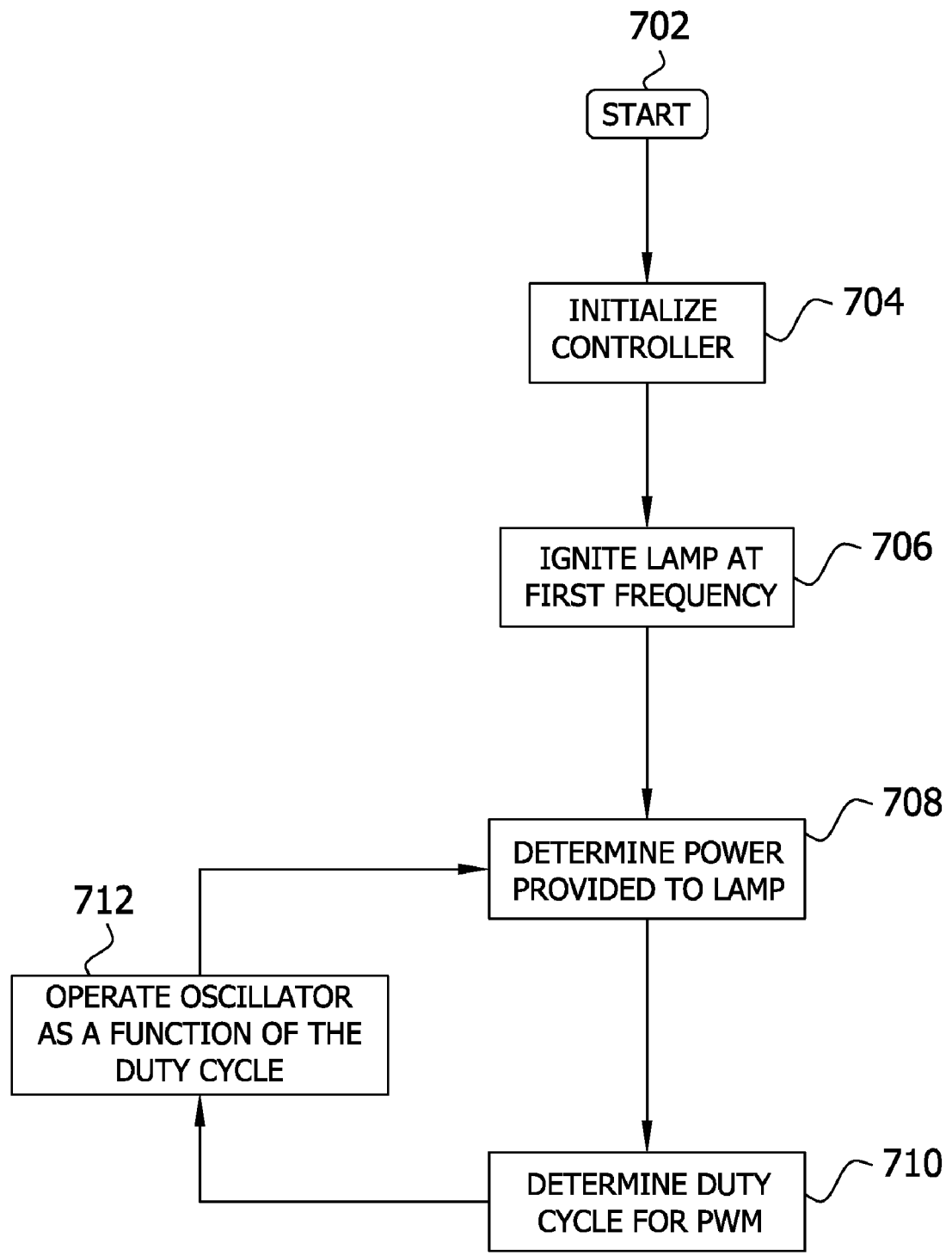

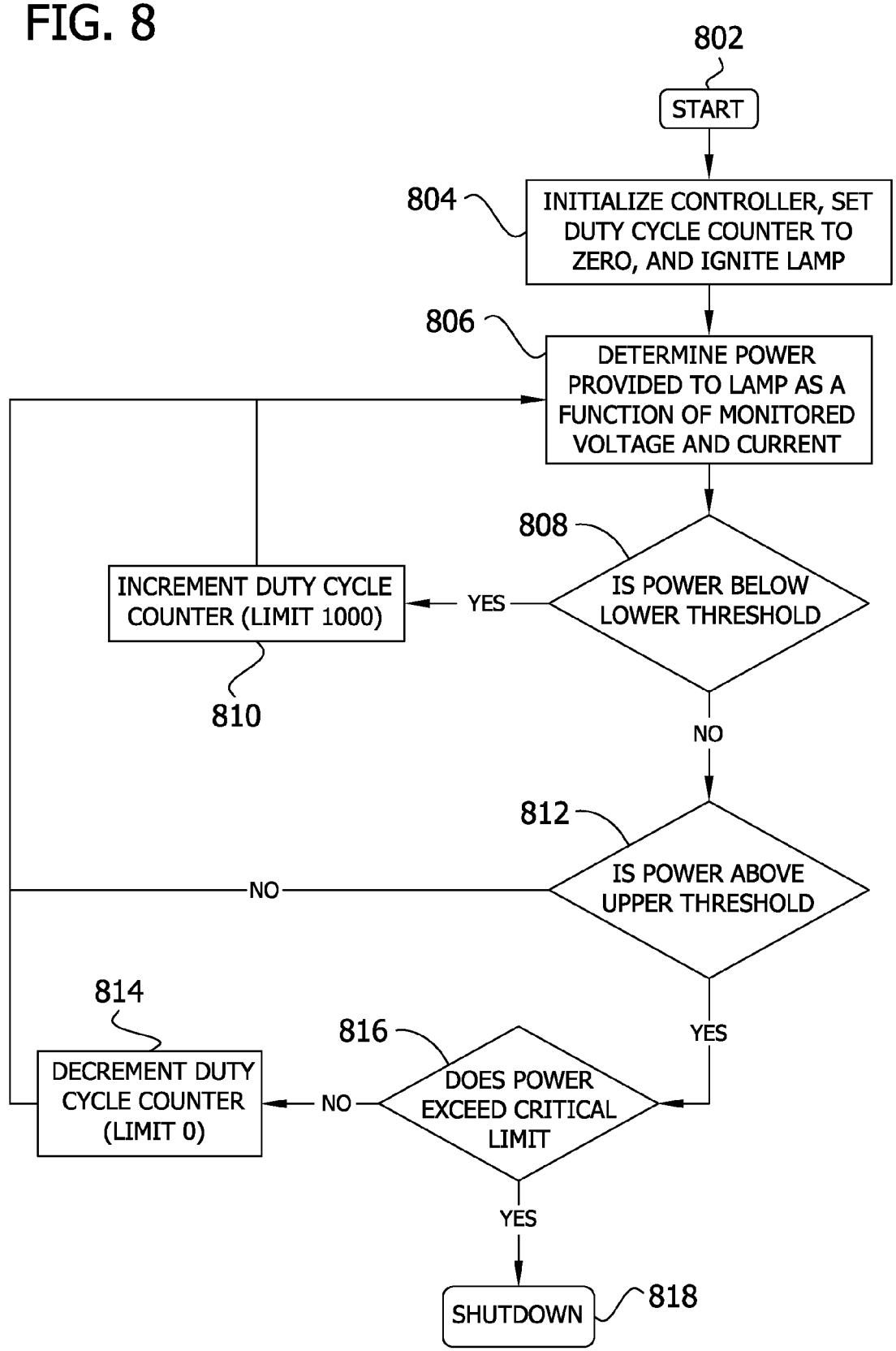

AGGREGATE IGNITION METHOD IN HIGH FREQUENCY METAL HALIDE LAMPS

FIELD OF THE INVENTION

The present invention generally relates to methods for igniting ceramic metal halide (ICMH) electric lamps. More particularly, the invention is concerned with using a rapid series of short ignition pulses to ignite a ceramic metal halide lamp.

BACKGROUND OF THE INVENTION

High intensity discharge (HID) lamps can be very efficient with lumen per watt factors of 100 or more. HID lamps can also provide excellent color rendering. Historically, HID lamps have been ignited by providing the lamp with a relatively long (5 milliseconds), high voltage (about 3-4 kilovolts peak to peak) ignition pulse. These relatively high power requirements necessitated the use of certain ballast circuit topologies and components having high power and voltage capacities. The required topologies and component capacities prevented miniaturization of ballasts and necessitated that starting and ballasting equipment be separate from the HID lamp. Therefore, HID lamps could not be used interchangeably with incandescent lamps in standard sockets. This limits their market use to professional applications, and essentially denies them to the general public that could benefit from the technology.

SUMMARY OF THE INVENTION

In one embodiment, a ballast includes a direct current (DC) converter, an oscillator, a switch, and a controller. The DC converter converts power from an alternating current (AC) power source to DC power and provides the DC power to the controller and the oscillator. The controller operates the switch to selectively enable and disable the oscillator from providing high frequency AC power to the lamp. The controller provides an ignition pulse train to the lamp by enabling the oscillator, determining whether the lamp has ignited, and disabling the oscillator for an inter-pulse cooling period if the lamp has not ignited. The oscillator repeats the enabling, determining and disabling a predetermined number of times or until the lamp ignites. If the lamp has not ignited during the ignition pulse train, then the controller disables the oscillator for an additional cooling period. The controller then repeats this process by providing at least one more ignition pulse train to the lamp. If the lamp has not ignited after a predetermined number of pulse trains, then the controller disables the oscillator for a sleep period. Upon conclusion of the sleep period, the controller again attempts to ignite the lamp by enabling the oscillator to provide the lamp with additional ignition pulse trains.

Other objects and features will be in part apparent and in part pointed out hereinafter.

BRIEF DESCRIPTION OF THE DRAWINGS

FIG. 3 is a flow chart of a method for igniting a metal halide lamp according to one embodiment of the invention.

FIG. 7 is a flow chart of a method of providing constant power to a lamp via a constant current oscillator using pulse width modulation according to one embodiment of the invention.

FIG. 8 is a flow chart of a method of providing constant power to a lamp via a constant current oscillator using pulse width modulation and adjusting pulse width in predetermined increments according to one embodiment of the invention.

Corresponding reference characters indicate corresponding parts throughout the drawings.

DESCRIPTION OF THE PREFERRED EMBODIMENTS

Figure 1:
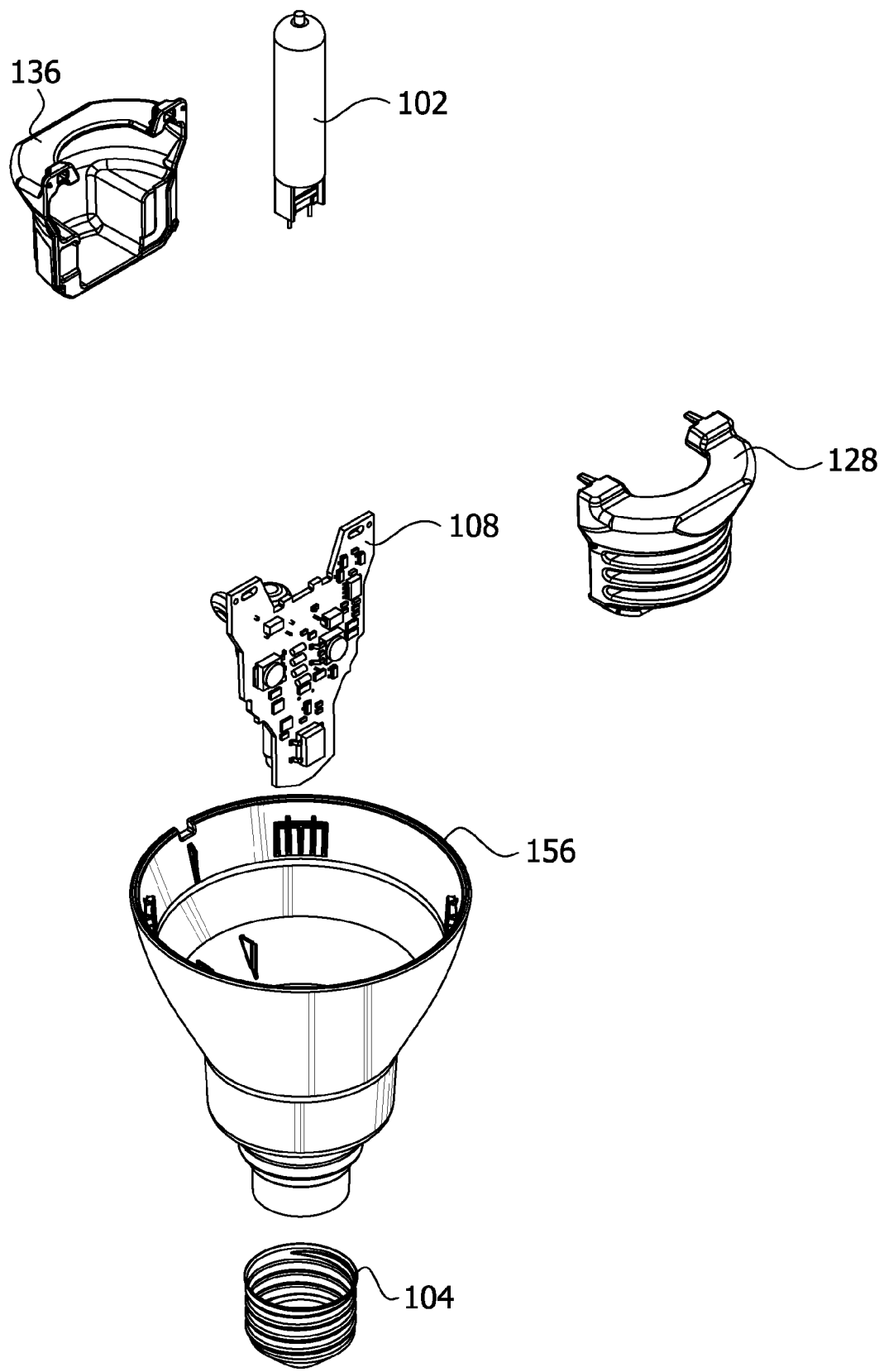
FIG. 1 is an exploded perspective illustration of one embodiment of the assembly of the invention showing the first and second shells, the circuit board, and the ceramic metal halide lamp which are to be positioned within the base according to one embodiment of the invention.

Referring to FIG. 1, a light source including an integrated ballast and HID lamp is shown in an exploded view. The HID lamp engages a circuit board 108 of the ballast and receives power from the circuit board 108 in operation. A first portion 136 and a second portion 128 of a heat sink thermally engage either side of the circuit board 108 of the ballast to dissipate heat generated by the ballast during operation of the lamp 102. An electrically non-conductive base 156 engages the heat sink (128 and 136), circuit board 108, a lamp 102, and a threaded connector 104 for engaging a socket (not shown). The threaded connector 104 connects the ballast to an alternating current (AC) power source (see FIGS. 4 and 5).

Figure 2:
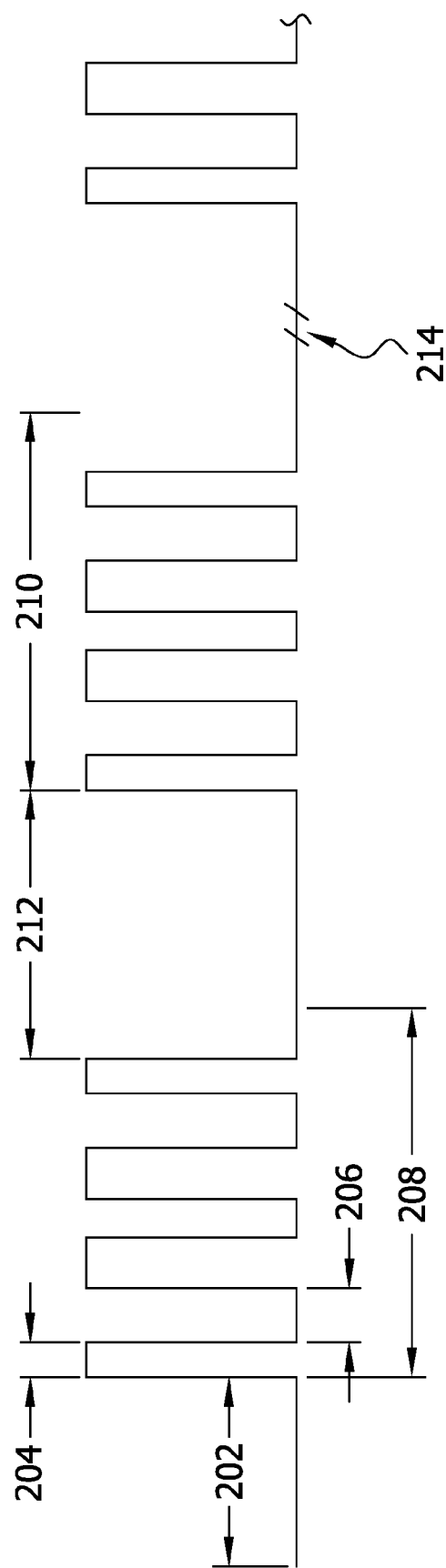
FIG. 2 is a timing diagram of a method for igniting a metal halide lamp according to one embodiment of the invention.

Referring to FIG. 2, a timing diagram for providing ignition pulses from an oscillator of the ballast to the lamp is shown. The diagram depicts the on and off switching of the oscillator of the ballast during ignition of the lamp, assuming that the lamp does not ignite during the depicted time frame. If the lamp ignites, then the ballast keeps the oscillator on to maintain power to the lamp.

When the ballast receives power from an alternating current (AC) power supply, the ballast converts the AC power to direct current (DC) power and initializes internal components of the ballast during a startup delay period 202. The ballast then proceeds to provide the lamp with an ignition pulse train 208. The ballast begins the ignition pulse train 208 by enabling the oscillator to oscillate and provides high frequency (e.g. 2.5 MHz) power to the lamp for a duration (e.g., 250 µs) defined by an ignition pulse 204. The ballast then disables the oscillator for an inter-pulse cooling period 206. The ballast thereafter provides additional ignition pulses separated by inter-pulse cooling periods until a predetermined number of ignition pulses have been provided to the lamp. The inter-pulse cooling period 206 minimizes the effects of hot spotting within each of the internal components of the ballast by allowing heat to dissipate throughout each component. Before providing a second pulse train 210 to the lamp (which is a repeat of the first pulse train 208), the ballast disables the oscillator for an additional cooling period 212 (e.g., 100 ms) allowing the internal components of the ballast to dissipate heat throughout the circuit board and heat sink and to cool. The additional cooling period 212 minimizes the chance of overheating individual internal components of the ballast. Following a predetermined number of ignition pulse trains (e.g., 2 ignition pulse trains), the ballast disables the oscillator for a sleep period 214 (e.g., 30 seconds). The sleep period 214 allows heat in the individual internal components of the ballast to spread through the circuit board 108, into the heat sink (128 and 136), and to dissipate from the light source to some extent.

Referring to FIG. 3, a method of operating a ballast to ignite and provide power to a metal halide lamp using a relatively low voltage (e.g., less than 4 kilovolts peak to peak) begins at 302. At 304, a controller of the ballast is initialized which includes setting an ignition pulse counter and an ignition pulse train counter to zero. At 306, the controller enables an oscillator of the ballast to oscillate, providing power to the lamp, and increments the ignition pulse counter. At 308, the controller determines whether the lamp has ignited. In one embodiment, the controller determines whether the lamp has ignited by checking a current of the oscillator. If the current is above a predetermined threshold, the controller determines that the lamp has not ignited and proceeds to 310. If the current is below the predetermined threshold, the controller determines that the lamp has ignited and proceeds to end the ignition portion of the method at 312, maintaining enablement of the oscillator such that the oscillator continues to oscillate and provide power to the lamp.

At 310, the controller determined whether the ignition pulse counter is below a predetermined limit. If the ignition pulse counter is below the predetermined limit, then the controller disables the oscillator for an inter-pulse cooling period at 314. Following the inter-pulse cooling period, the controller proceeds back to 306 where it enables the oscillator to oscillate and increments the ignition pulse counter.

If at 318 the controller determines that the ignition pulse counter is not below the predetermined limit, then at 316, the controller disables the oscillator for an additional cooling period. At 318, the controller determines whether the ignition pulse train counter is less than a second predetermined limit. If the ignition pulse train counter is less than the second predetermined limit, then at 320, the controller resets the ignition pulse counter (i.e., sets the ignition pulse counter to zero) and increments the ignition pulse train counter. The controller then begins another ignition pulse train at 306 by enabling the oscillator and incrementing the ignition pulse counter.

If at 310 the controller determines that the ignition pulse counter is not below the second predetermined limit, then at 322, the controller disables the oscillator for a sleep period. Following the sleep period, at 324, the controller resets the ignition pulse counter and the ignition pulse train counter (i.e., sets the counters to zero) and proceeds to begin another ignition pulse train at 306. In one embodiment, each ignition pulse is 250 µs, the ignition pulse counter limit is 20, the inter-pulse cooling period is 4.75 ms, the additional cooling period is 100 ms, the ignition pulse train counter limit is 2, and the sleep period is 30 seconds.

One skilled in the art will recognize various modifications to the ignition method shown in FIG. 3. For example, the counters may be set to an initial value and decremented toward zero. Additionally, the order of some steps may vary. For example, the counters may be incremented or reset before the additional cooling period and/or sleep period. Also, the counters may be time based instead of instance based. That is, the method may provide a first pulse train having a predetermined profile for a first period of time, rest for a second period of time, provide another pulse train of the predetermined profile for a third period of time, sleep for a fourth period of time, and then restart again with the first pulse train. In one embodiment of the invention, each ignition pulse lasts 250 µs, the inter-pulse cooling period is 8 ms, and each pulse train lasts 2 seconds. The additional cooling period between a first pulse train and a second pulse train is 5 seconds. The sleep period follows the second pulse train and lasts 60 seconds. In other words, the first pulse train lasts two seconds, the additional cooling period lasts the next 5 seconds, the second pulse train lasts the next 2 seconds, and the sleep period lasts the next 60 seconds for a total of 70 seconds. This 70 second cycle is repeated until the lamp ignites.

Figure 4A:
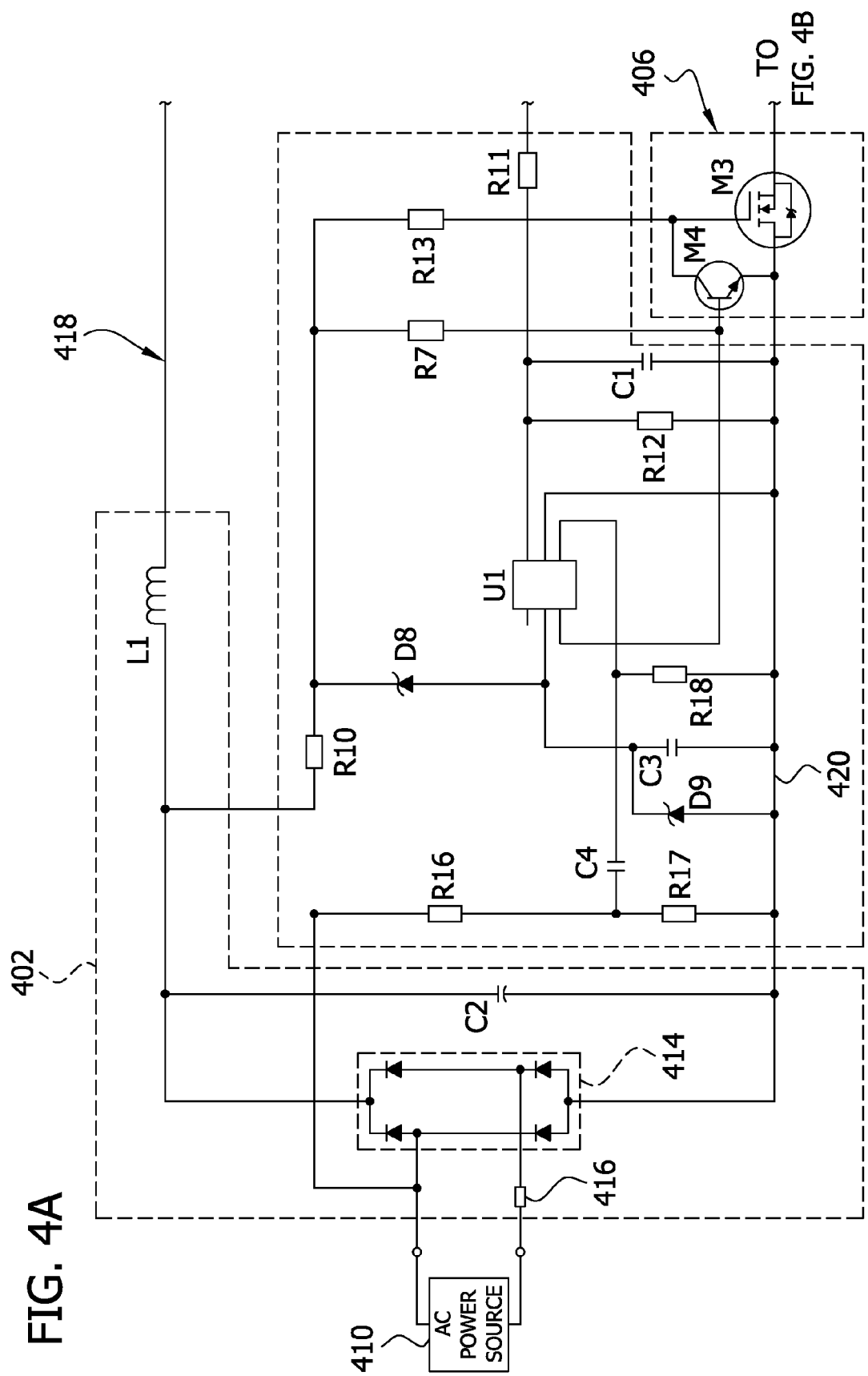
FIGS. 4A and 4B show a schematic diagram of a ballast which uses a switch to selectively open circuit and close circuit a power supply loop of an oscillator of the ballast according to one embodiment of the invention.
Figure 4B:
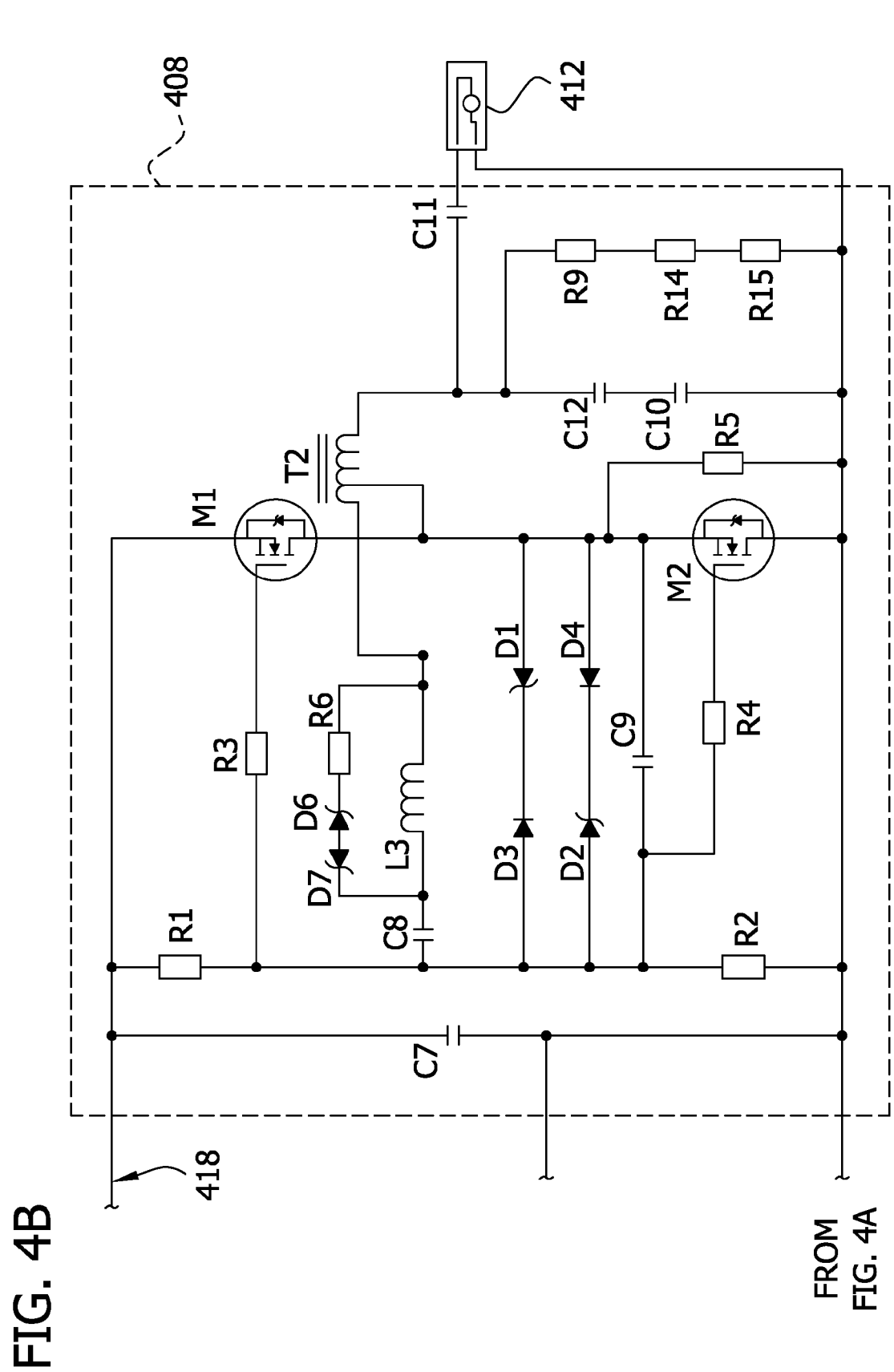

Referring to FIGS. 4A and 4B, a ballast according to one embodiment of the invention includes an AC to DC converter 402, a controller 404, a switch 406, and an oscillator 408. The ballast receives power from an AC power source 410, converts the power to DC power, and provides a high frequency output to a lamp 412 from the DC power.

The DC converter 402 receives the power from the AC power source 410. The DC converter 402 includes a full wave rectifier 414 for rectifying the AC power from the AC power supply 410, and a fuse 416 for disabling the ballast should the ballast fail (e.g., short circuit). The DC converter also includes a capacitor C2 and an inductor L1 for smoothing the rectified AC power from the full wave rectifier 414 and for reducing radio frequency electromagnetic emissions from the ballast during operation.

The controller 404 includes a processor U1 (e.g., a microprocessor such as a PIC10F204T-I/OT, IC PIC MCU FLASH 256X12 SOT23-6 manufactured by Microchip Technology and programmed as illustrated in FIG. 3) that receives a bias supply from the AC power supply via a resistor R10, upper and lower zener diodes D8 and D9, and a capacitor C3. The resistor R10 is connected to an output of the full wave rectifier 414, and the upper zener diode D8 and lower zener diode D9 form a voltage divider where the capacitor C3 is in parallel with the lower zener diode D9. The processor U1 receives the bias supply from the junction of the upper zener diode D8, the lower zener diode D9, and the capacitor C3.

The controller 404 monitors a voltage of the AC power source which enables the controller 404 to synchronize ignition pulses with the voltage of the AC power source 410. An upper resistor R16 is connected to the AC power source 410 and the lower resistor R17 is connected between the upper resistor R16 and ground 420 of the full wave rectifier 414. A DC blocking capacitor C4 is connected between the upper and lower resistors R16 and R17 and an input of the processor U1. A pull down resistor R18 is also connected to the input of the processor U1 and ground 420.

The DC converter 402 supplies the converted DC power to the oscillator 408 via a power supply loop consisting of a DC power line 418 from the inductor L1 and ground 420 of the full wave rectifier 414. In the embodiment shown in FIGS. 4A and 4B, the switch 402 is in the ground connection for the oscillator 408. The switch comprises a transistor M4 and a driven gate field effect transistor M3 for selectively close circuiting and open circuiting the power supply loop of the oscillator 408 in response to input from the processor U1 of the controller 404. Thus, the controller 404 can selectively enable and disable the oscillator 408 via the switch 406. In another embodiment, the switch 406 is connected in the DC power line 418 to selectively close circuit and open circuit the power supply loop of the oscillator 408.

In the embodiment shown in FIGS. 4A and 4B, the oscillator 408 is a self resonating half bridge. When enabled (i.e., when the power supply loop of the oscillator 408 is closed circuited), the oscillator 408 receives DC power from the DC converter 402 and provides a high frequency (e.g., 2-3 MHz) output to the lamp 412. The self resonating half bridge (i.e., oscillator 408) includes a capacitor C7 connected across the power supply loop of the oscillator 408 (i.e., between the DC power line 418 and ground 420). An upper resistor R1 and a lower resistor R2 are connected in series to form a voltage divider across the power supply loop, the voltage divider including a center point.

An inverter of the oscillator includes an upper switch M1 and a lower switch M2 connected in series across the power supply loop, the connection between the upper switch M1 and the lower switch M2 forming an output of the inverter. An input of the upper switch M1 is connected to the center point of the voltage divider via resistor R3. An input of the lower switch is connected to the center point of the voltage divider by a resistor R4, and capacitor C9 connects a drain of the lower switch M2 (i.e., the output of the inverter) to the center point of the voltage divider. The anode of diode D4 is connected to the output of the inverter and the cathode of diode D4 is connected to the cathode of zener diode D2. The anode of zener diode D2 is connected to the center point of the voltage divider. The anode of zener diode D1 is connected to the output of the inverter, and the cathode of zener diode D1 is connected to the cathode of diode D3. The anode of diode D3 is connected to the center point of the voltage divider. A capacitor C8, an inductor L3, and a feedback winding of a transformer T2 are connected in series between the center point of the voltage divider and the output of the inverter with the capacitor connected to the center point of the voltage divider and the feedback winding connected to the output of the inverter. The cathode of diode D7 is connected between the capacitor C8 and the inductor L3 and the anode of diode D7 is connected to the anode of diode D6. The cathode of diode D6 is connected via a resistor R6 to the connection between inductor L3 and the feedback winding of transformer T2 such that the diodes D7 and D6 and resistor R6 are connected in series with one another and in parallel across inductor L3.

The output of the inverter is connected to the lamp 412 via a primary winding of the transformer T2 and a DC blocking capacitor C1. Capacitors C12 and C10 are connected in series between the connection of the primary winding of transformer T2 to the DC blocking capacitor C11 and ground 420. The lamp 412 is connected between the DC blocking capacitor C11 and ground 420. Bias resistors R5, R9, R14, and R15 provide a bias converter to the self oscillating half bridge to ensure that the oscillator 408 responds quickly to begin providing the high frequency output to the lamp 412 when enabled. Bias resistor R5 is connected between the output of the inverter and ground 420, and bias resistors R9, R14, and R15 are connected in series with one another between the connection between the primary winding of the transformer T2 and ground 420.

Figure 5A:
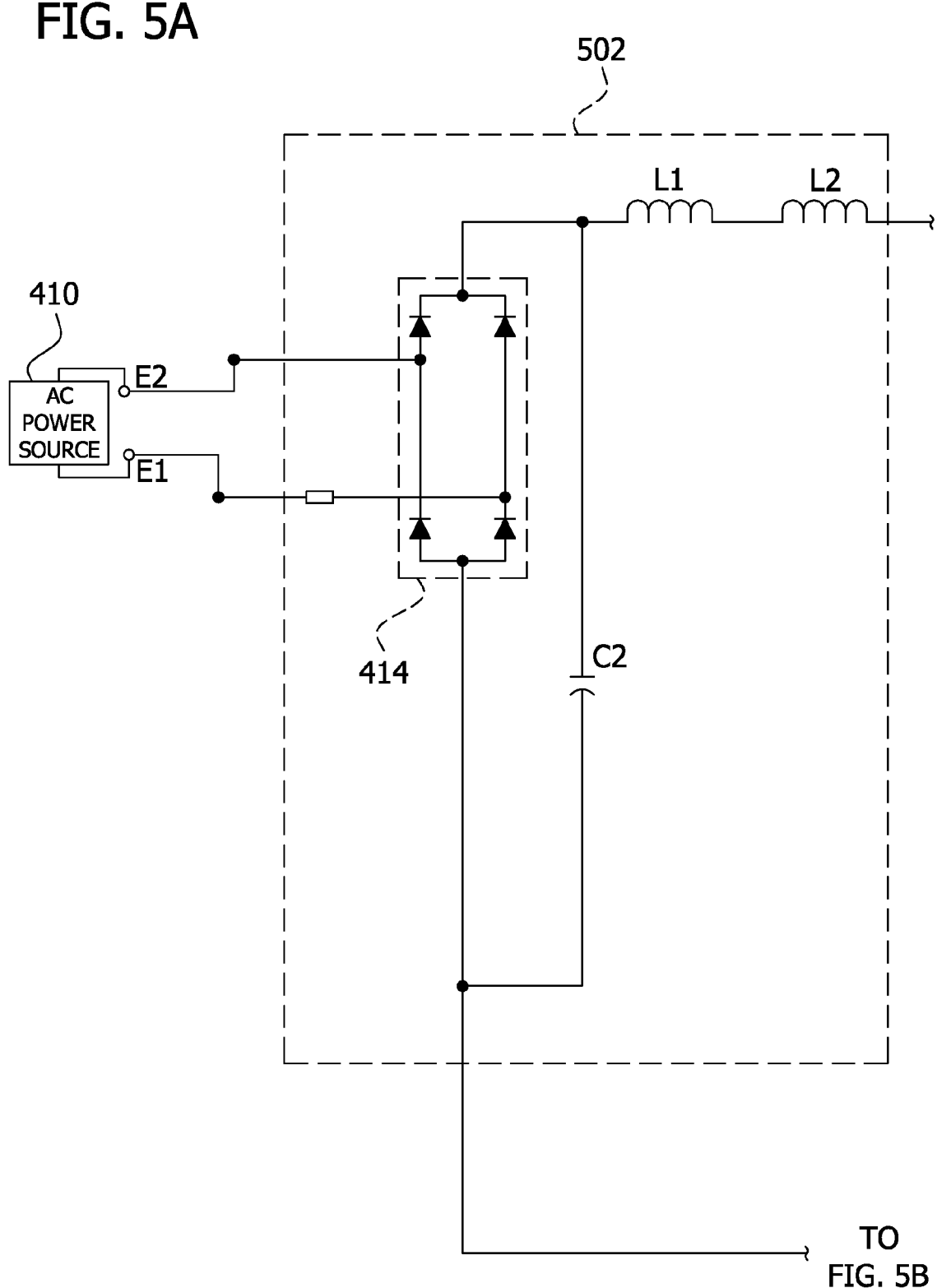
FIGS. 5A, 5B, and 5C combined are a schematic diagram of a ballast which uses a switch to selectively tune and detune an inductor of an oscillator of the ballast according to one embodiment of the invention.
Figure 5B:
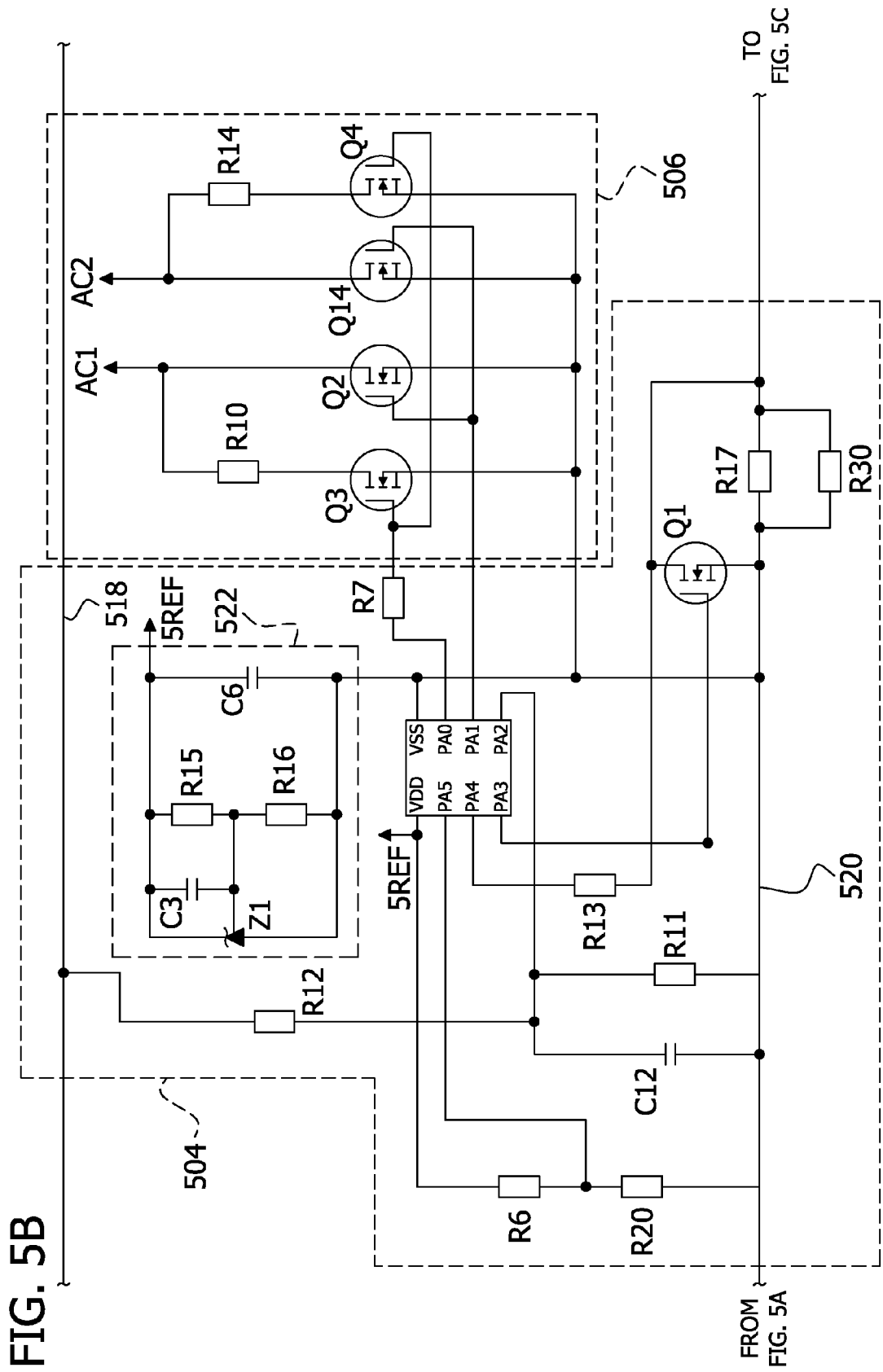
Figures 5B, 5C:
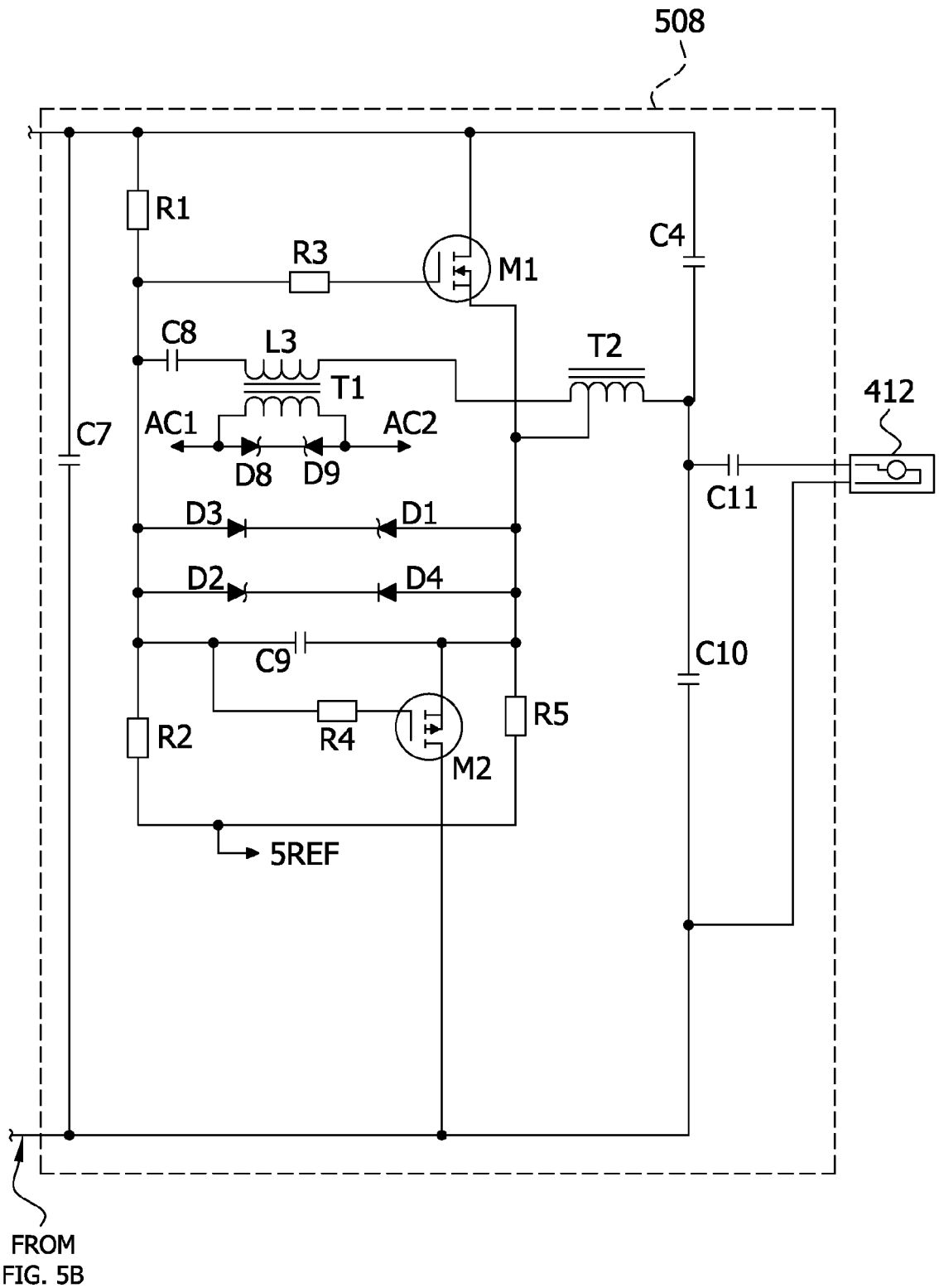

Referring now to FIGS. 5A, 5B, and 5C, a ballast according to another embodiment includes a DC converter 502, a controller 504, a switch 506, and an oscillator 508. The DC converter 502 differs from the DC converter 402 of FIGS. 4A and 4B only in that it includes a second inductor L2 for further reducing radio frequency electromagnetic interference emissions. The DC converter 502 receives power from the AC power source 410 and provides DC power to the oscillator 508 via DC power line 518.

The controller 504 monitors a voltage of the DC power provided by the DC converter 502. An upper resistor R12 is connected in series with a lower resistor R11 between the DC power line 518 and ground 520. A capacitor C12 is connected in parallel with the lower resistor R11, and the input to a processor U2 (e.g., a microprocessor such as a ST7FLITEUS5M3, 8-Bit MCU with single voltage flash memory, ADC, Timers manufactured by STmicro and programmed as noted below) of the controller 504 is connected to the connection between the upper resistor R12, the lower resistor R11, and the capacitor C12.

The controller 504 also monitors a current of a power supply loop of the oscillator 508. Resistors R17 and R30 are connected in parallel in the ground line between the oscillator 508 and the DC converter 502. An input of the processor U2 is connected via a resistor R13 to the oscillator 508 side of the resistors R17 and R30 connected to the oscillator 508. The processor U2 can thus check the voltage drop across the resistors R17 and R30 to determine the current of the power supply loop of the oscillator 508. A bypass field effect transistor Q1 is also connected in parallel with the resistors R17 and R30. An input of the bypass transistor Q1 is connected to the processor U2 such that the processor can bypass the resistors R17 and R30 when the processor is not determining the current of the power supply loop of the oscillator 508. The bypass transistor Q1 increases the efficiency of the ballast by reducing power dissipation in the resistors R17 and R30.

The oscillator 508 (i.e., the self resonating half bridge) only slightly varies from the oscillator 408 of FIGS. 4A and 4B. Capacitor C12 has been removed such that capacitor C10 is directly connected to the connection between the primary winding of transformer T2 and capacitor C11. Bias resistors R9, R14, and R15 have been removed, and a capacitor C4 has been added between the DC power line 518 and the connection between the primary winding of the transformer T2 and the capacitor C11. Lower resistor R2 and resistor R5 are directly connected to a 5 volt reference point 5REF instead of to ground 520 through a switch. The 5 volt reference point 5REF is provided by a 5 volt reference circuit 522 of the controller 504.

The processor U2 of the controller 504 receives the 5 volt reference from the 5 volt reference circuit 522, and the 5 volt reference circuit 522 draws a bias current through the oscillator 508 from the DC power line 518. A voltage divider including an upper resistor R6 and a lower resistor R20 are connected in series between the 5 volt reference point 5REF and ground 520 to provide the processor with a second reference voltage from the connection between the upper resistor R6 and the lower resistor R20. In one embodiment, the lower resistor R20 is a negative temperature coefficient thermistor and the second reference voltage is indicative of a temperature of the ballast. This enables the processor U2 to monitor the temperature of the ballast and disable the oscillator 508 if the monitored temperature exceeds a predetermined threshold.

Another difference between the ballast of FIGS. 4A and 4B and the ballast of FIGS. 5A, 5B, and 5C involves how the controller 504 selectively enables and disables the oscillator 508 via the switch 506. In the oscillator 508 of FIG. 5C, the zener diodes D6 and D7 and resistor R6 have been removed. Inductor L3 in FIG. 5C is the primary winding of a transformer T1. A pair of zener diodes D8 and D9 connected in series across a secondary winding of the transformer T1. The anode of D8 is connected to a first side of the secondary winding of the transformer T1 and the cathode of diode D8 is connected to the cathode of diode D9. The anode of diode D9 is connected to a second side of the secondary winding of the transformer T1.

The switch 506 of the ballast shown in FIG. 5B operates to tune and detune the inductor L3 (i.e., the primary winding of transformer T1) such that oscillator 508 is selectively enabled and disabled. The switch 506 comprises a plurality of field effect transistors operated by the processor U2. Transistor Q3 is connected to ground 520 and connected by a resistor R10 to the first side of the secondary winding of the transformer T1 of the oscillator 508. Transistor Q2 is connected between ground 520 and the first side of the secondary winding of the transformer T1 of the oscillator 508. Transistor Q14 is connected between ground 520 and the second side of the secondary winding of the transformer T1 of the oscillator 508. Transistor Q4 is connected to ground 520 and connected by a resistor R14 to the second side of the secondary winding of the transformer T1 of the oscillator 508. The controller 504 has a first output connected to the inputs of transistors Q3 and Q4 via resistor R7. The controller has a second output connected to the inputs of transistors Q2 and Q14. The controller can activate all of the transistors (Q3, Q2, Q14, and Q4), none of the transistors (Q3, Q2, Q14, and Q4), activate transistors Q3 and Q4 while transistors Q2 and Q14 are deactivated, or activate transistor Q2 and Q14 while transistor Q3 and Q4 are deactivated. These various combinations give the controller 504 the ability to selectively enable and disable the oscillator 508 by tuning the inductor L3 (i.e., the primary winding of transformer T1 of the oscillator 508) for oscillation or detuning the inductor L3 to prevent oscillation of the oscillator 508. The switch array as shown in FIG. 5B also gives the controller 504 the ability to incrementally vary the inductance of L3 in order to operate the oscillator 508 at two different, discrete frequencies (e.g., 2.5 MHz and 3.0 MHz). To operate the oscillator 508 at a first frequency (e.g., 2.5 MHz), the controller 504 deactivates all of the switch transistors Q3, Q4, Q2, and Q14. To operate the oscillator 508 at a second frequency (e.g., 3.0 MHz), the controller 504 activates transistors Q3 and Q4 while transistors Q2 and Q14 are deactivated. To detune inductor L3 and disable the oscillator 508, the controller 504 activates transistors Q2 and Q14 which shorts the secondary winding of the transformer T1.

In another embodiment of the invention, the switch 506 includes only 2 field effect transistors such that the switch 506 can selectively enable and disable the oscillator 508, but cannot operate the oscillator 508 at multiple discrete frequencies.

The ability to operate the constant current oscillator 508 at 2 discrete frequencies enables the ballast to operate at 2 different power levels and to switch between the 2 power levels to provide relatively constant power to the lamp 412 (e.g., to maintain the power within a predetermined range such as 19 to 21 watts). Because the oscillator 508 provides a constant current to the lamp 412, as the frequency of the high frequency output to the lamp 412 from the oscillator 508 increases, the power provided to the lamp 412 decreases. Conversely, as the frequency of the high frequency output to the lamp 412 from the oscillator 508 decreases, the power provided to the lamp 412 increases.

Figure 6:
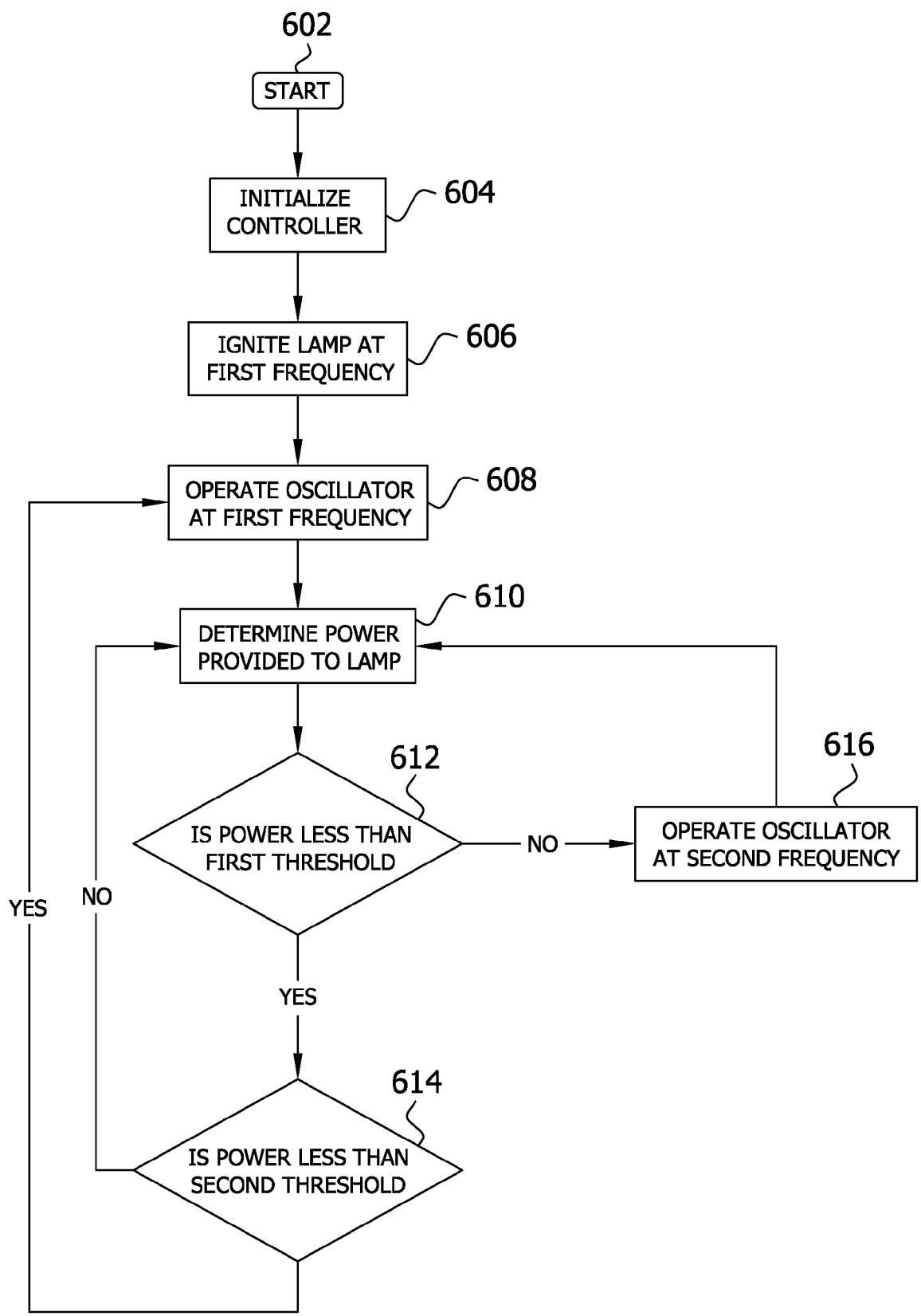
FIG. 6 is a flow chart of a method of providing constant power to a lamp via a constant current oscillator according to one embodiment of the invention.

Referring to FIG. 6, one embodiment of a method for controlling the power provided to the lamp 412 by the ballast of FIGS. 5A, 5B, and 5C is shown. The method begins at 602, and the controller 504 is initialized at 604. At 606, the controller operates the oscillator 508 at a first frequency (e.g., 2.5 MHz) during the ignition process. Alternatively, the controller 504 could operate the oscillator 508 at a second, higher frequency (e.g., 3.0 MHz) during ignition of the lamp 412. Following ignition, at 608 the controller 504 operates the lamp at the first frequency for a predetermined period of time. At 610, the controller 504 determines the power provided to the lamp 412 by the oscillator 508 as a function of the monitored voltage of the DC power line 518 and the monitored current in the power supply loop of the oscillator 508 as discussed above with respect to FIGS. 5A, 5B, and 5C. At 612, if the power is not less than the first threshold, then the controller 504 proceeds to 616 and operates the oscillator 508 at the second frequency before proceeding back to 610. If at 612 the power is less than a first threshold (e.g., 21 watts), then at 614, the controller determines whether the power is less than a second threshold (e.g., 19 watts). If the power is less than the second threshold, then the controller 504 operates the oscillator 508 at the first frequency at 608 before proceeding to 610. If the power is not less than the second threshold, then the controller 504 proceeds back to 610 to determine the power provided to the lamp 412. The method ends when the AC power source is disconnected from the ballast.

In an alternative embodiment, one frequency is the default frequency and the frequency of the oscillator 508 is switched when the power provided to the lamp 412 falls above or below a predetermined threshold. For example, the oscillator 508 is operated at 2.5 MHz unless the determined power exceeds 20 watts, and if the power exceeds 20 watts, then the oscillator 508 is operated at 3.0 MHz until the provided to the oscillator 508 is below 20 watts. When the power falls below 20 watts, the ballast reverts to operating the oscillator 508 at 2.5 MHz.

Referring now to FIG. 7, another embodiment of a method of operating the oscillator 508 to provide the lamp 412 with constant power is shown. The method begins at 702 and at 704, the controller 504 is initialized. At 706, the controller 504 operates the oscillator 508 at a first frequency (e.g., 2.5 MHz) to ignite the lamp 412. At 708, the controller 504 determines the power provided to the lamp 412. Then, at 710, the controller 504 determines a duty cycle of Q3 and Q4 as a function of the power provided to the lamp 412. The determined duty cycle is indicative of percentage of time that the controller 504 is to operate the oscillator 508 at the first frequency versus the percentage of time that the controller is to operate the oscillator 508 at the second frequency. In one embodiment, the controller 504 determines the duty cycle by matching the determined power to an entry in a lookup table. In another embodiment, the controller 504 calculates the duty cycle as a function of the power, and optionally, the monitored temperature of the ballast. For example, the controller 504 may reduce the power supplied to the lamp 412 as the ballast approaches a thermal limit of the ballast. At 712, the controller 504 employs the determined duty cycle using pulse width modulation to operate the oscillator 508 at the first and second frequencies for the indicated percentages of time. The method then proceeds to 708 to again determine the power provided to the lamp 412, and the method ends when the AC source 410 is disconnected from the ballast.

Additionally, as the metal halide lamp 412 approaches the end of a useful life of the lamp 412, the lamp 412 increases in resistance which requires the ballast to provide the lamp 412 with additional power. When the power provided to the lamp exceeds a predetermined critical limit, the ballast determines that the lamp 412 has reached the end of the useful life and disables the oscillator 508.

In one embodiment of FIG. 7, a lookup table contains discrete values previously calculated using an algorithm. One algorithm varies the duty cycle linearly as a function of an amount by which the determined power varies from a target power. Another algorithm varies the duty cycle exponentially as a function of an amount by which the determined power varies from a target power. In an alternative embodiment, the controller 504 may directly implement any of the disclosed algorithms. In one embodiment, the controller 504 operates the oscillator 508 at a duty cycle of 50% at the target power under ideal conditions. In other embodiments, the controller 504 operates the oscillator at a duty cycle (e.g., 65%) indicative of more time per period at the first frequency (e.g., 2.5 MHz) as opposed to the second frequency (e.g., 3.0 MHz) in order to increase efficiency of the ballast.

Referring to FIG. 8, the controller 504 determines the duty cycle by adjusting the duty cycle in predetermined increments in response to the monitored current and voltage exceeding upper and/or lower thresholds according to one embodiment. The controller 504 includes a duty cycle counter, and the duty cycle is directly proportional to the duty cycle counter (e.g., a duty cycle count). The method begins at 802, and at 804, the controller 504 initializes, sets the duty cycle counter to zero, and ignites the lamp 412. In one embodiment, the duty cycle counter has an upper limit of 1000, a lower limit of zero, and the duty cycle (when represented as a percentage) is equal to the duty cycle counter divided by 10. The controller 504 periodically (e.g., every millisecond) determines the power provided to the lamp 412 as a function of the monitored voltage of the oscillator 508 and the current of the power loop by multiplying said voltage and said current at 806. The controller 504 then determines at 806 whether the determined power (e.g., power consumption) is above or below a lower threshold (e.g., 19.5 Watts). If the determined power is below the lower threshold, then at 810, the controller increments the duty cycle counter. If the determined power is not below the lower threshold, then the controller 504 determines whether the determined power is above an upper threshold (e.g., 20.5 Watts) at 812. If the determined power is above the upper threshold, then the controller 504 decrements the duty cycle counter at 814. During the following period (e.g., during the next millisecond), the controller 504 operates the oscillator 508 at the first frequency (e.g., at about 2.5 MHz) for the fraction of the period indicated by the duty cycle (when represented as a percentage) and operates the oscillator 508 at the second frequency (e.g., 3.0 MHz) for the remainder of the period. Additionally, as discussed above, the controller 504 may prefer to operate the oscillator 508 at the first frequency for a greater share of a period in order to increase the efficiency of the ballast. For example, under ideal conditions, at the target power (e.g., 20 watts), the controller 504 may operate the oscillator at the first frequency (e.g., 2.5 MHz) for 70% of a given period versus 30% of the given period at the second frequency (e.g., 3 MHz).

Further, in one embodiment, if the duty cycle counter has reached its minimum (e.g., lower limit of 0), and the determined power remains above the upper threshold, the controller 504 continues to operate the oscillator 508 at the second frequency (e.g., 3 MHz) until the determined power exceeds a critical limit (e.g., 28 watts). When the determined power exceeds the critical limit at 816, the controller 504 determines that the lamp 412 has reached the end of its useful life and shuts down the oscillator 508 at 818 to minimize the risk of mechanical bulb failure.

Having described the invention in detail, it will be apparent that modifications and variations are possible without departing from the scope of the invention defined in the appended claims. For example, bi-modal power regulation aspects of the embodiments of FIGS. 5A-7 could be combined with the switch 406 of FIGS. 4A and 4B to produce a ballast having a relatively fast oscillator enable/disable response and regulated power to the lamp.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

Having described aspects of the invention in detail, it will be apparent that modifications and variations are possible without departing from the scope of aspects of the invention as defined in the appended claims. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of igniting a metal halide lamp driven by a high frequency ballast, said ballast including an oscillator for selectively providing power to the lamp, said method comprising:
   providing an ignition pulse train to the lamp for a first period, wherein providing the ignition pulse train comprises:
      enabling oscillations of the oscillator to provide power to the lamp for an ignition pulse period;
      thereafter determining whether the lamp has ignited;
      thereafter disabling the oscillator for an inter-pulse cooling period if the determining indicates that the lamp has not ignited;
      repeating said enabling oscillations of the oscillator, said determining whether the lamp has ignited, and said disabling the oscillator a predetermined number of times;
   thereafter determining whether the lamp has ignited;
   thereafter disabling the oscillator for an additional cooling period if said determining indicates that the lamp has not ignited; and
   repeating the above if the lamp has not ignited.

2. The method of claim 1 further comprising:
   upon conclusion of the additional cooling period, providing a second ignition pulse train to the lamp for a second period;
   thereafter determining whether the lamp has ignited;
   thereafter disabling the oscillator for a sleep period if said determining indicates that the lamp has not ignited.

3. The method of claim 2 wherein:
   the first period is equal to the second period,
   the first and second periods are each about 2 seconds,
   the additional cooling period is longer than the inter-pulse cooling period,
   the ignition pulse period is about 250 microseconds,
   the inter-pulse cooling period is about 8 milliseconds,
   the predetermined number of times is 242,
   the additional cooling period is about 5 seconds, and
   the sleep period is 60seconds.

4. The method of claim 1 wherein determining whether the lamp has ignited comprises:
   monitoring a current of a power supply loop of the oscillator; and
   determining whether the monitored current of the power supply loop is below a threshold, said threshold being indicative of ignition of the lamp.

5. The method of claim 1 wherein the oscillator is a self resonating half bridge, the oscillator oscillates at a frequency greater than 2 MHz, and the ballast has a relatively low open circuit voltage capacity, said open circuit voltage capacity being less than 2 kV.

6. The method of claim 1 wherein enabling oscillations of the oscillator to provide power to the lamp comprises at least one of the following:
   tuning an inductor of the oscillator; and
   completing a power supply loop of the oscillator.

7. The method of claim 1, wherein repeating said enabling oscillations of the oscillator comprises:
   repeating said enabling oscillations of the oscillator, said determining whether the lamp has ignited, and said disabling the oscillator until the lamp has ignited.

8. A high frequency metal halide lamp ballast for providing power to a metal halide lamp from an alternating current (AC) power source, said ballast comprising:
   a direct current (DC) converter for receiving AC power from the AC power source and providing DC power;

an oscillator connected to the converter for receiving the DC power and connected to the lamp for selectively providing high frequency AC power to the lamp;

a switch connected to the oscillator for selectively enabling oscillations of the oscillator to provide the high frequency AC power to the lamp; and a controller connected to the switch for controlling the switch to selectively enable oscillations of the oscillator, wherein the controller controls the switch to:

provide an ignition pulse train to the lamp for a first period, wherein providing the ignition pulse train comprises:
enabling oscillations of the oscillator to provide power to the lamp for an ignition pulse period;
thereafter determining whether the lamp has ignited;
thereafter disabling the oscillator for an inter-pulse cooling period if the determining indicates that the lamp has not ignited;
repeating said enabling oscillations of the oscillator to provide power, determining whether the lamp has ignited, and disabling the oscillator a predetermined number of times;
thereafter determine whether the lamp has ignited;
thereafter disable the oscillator for an additional cooling period if said determining indicates that the lamp has not ignited; and
repeats the above until the controller determines that the lamp has ignited, and thereafter enables the oscillator to provide power to the lamp.

9. The ballast of claim 8 wherein the controller further controls the switch to:
upon conclusion of the additional cooling period, provide a second ignition pulse train to the lamp for a second period;
thereafter determine whether the lamp has ignited; and
thereafter disable the oscillator for a sleep period if said determining indicates that the lamp has not ignited.

10. The ballast of claim 9 wherein:
the first period is equal to the second period,
the first and second periods are each about 2 seconds,
the additional cooling period is longer than the inter-pulse cooling period,
the ignition pulse period is about 250 microseconds,
the inter-pulse cooling period is about 8 milliseconds,
the predetermined number of times is 242,
the additional cooling period is about 5 seconds, and
the sleep period is 60 seconds.

11. The ballast of claim 9 wherein the oscillator oscillates at a frequency greater than 2 MHz, the oscillator is a self resonating half bridge, and the ballast has a relatively low open circuit voltage capacity, said open circuit voltage capacity being less than 4 kV peak to peak.

12. The ballast of claim 9 wherein the controller monitors a current of a power supply loop of the oscillator and compares the monitored current to a threshold to determine whether the lamp has ignited.

13. The ballast of claim 9 wherein the switch enables the oscillator to provide power to the lamp by at least one of the following:
tuning an inductor of oscillator, said tuning comprising altering an inductance of the inductor; and
closing a power supply loop of the oscillator.

14. The ballast of claim 8, wherein repeating said enabling oscillations of the oscillator to provide power comprises:
repeating said enabling oscillations of the oscillator to provide power, determining whether the lamp has ignited, and disabling the oscillator until the lamp has ignited.

15. A light source comprising:
a metal halide lamp for providing light in response to receiving power; and a ballast for igniting the lamp and providing power to the lamp from an alternating current (AC) power source, said ballast comprising:
a direct current (DC) converter for receiving AC power from the AC power source and providing DC power;
an oscillator for receiving the DC power from the DC converter and selectively providing high frequency AC power to the lamp;
a switch for selectively enabling oscillations of the oscillator to provide power to the lamp; and
a controller for controlling the switch to selectively enable the oscillator, wherein the controller controls the switch to:
provide at least one ignition pulse train to the lamp for a first period, wherein providing the ignition pulse train comprises:
enabling oscillations of the oscillator to provide power to the lamp for an ignition pulse period;
thereafter determining whether the lamp has ignited;
thereafter disabling the oscillator for an inter-pulse cooling period if the determining indicates that the lamp has not ignited;
repeating said enabling oscillations of the oscillator to provide power, determining whether the lamp has ignited, and disabling the oscillator a predetermined number of times;
thereafter determine whether the lamp has ignited;
thereafter disable the oscillator for an additional cooling period if said determining indicates that the lamp has not ignited;
repeat the above until the controller determines that the lamp has ignited, and
thereafter enable the oscillator to provide power to the lamp.

16. The light source of claim 15 wherein the controller further controls the switch to:
upon conclusion of the additional cooling period, provide a second ignition pulse train to the lamp for a second period;
thereafter determine whether the lamp has ignited; and
thereafter disable the oscillator for a sleep period if said determining indicates that the lamp has not ignited.

17. The light source of claim 16 wherein the oscillator oscillates at a frequency greater than 2 MHz, the oscillator is a self resonating half bridge, the ballast has a relatively low open circuit voltage capacity, said open circuit voltage capacity being less than 2 kV, the ballast is integral with the metal halide lamp, and the integral ballast and lamp are operable within a parabolic aluminized reflector (PAR) 38 fixture.

18. The light source of claim 16 wherein the controller monitors a current of a power supply loop of the oscillator and compares the monitored current to a threshold to determine whether the lamp has ignited.

19. The light source of claim 16 wherein the switch enables the oscillator to provide power to the lamp by at least one of the following:
tuning an inductor of oscillator, said tuning comprising altering an inductance of the inductor; and
closing a power supply loop of the oscillator.

20. The light source of claim 15, wherein repeating said enabling oscillations of the oscillator to provide power comprises:
repeating said enabling oscillations of the oscillator to provide power, determining whether the lamp has ignited, and disabling the oscillator until the lamp ignites.

* * * * *